3,033,905
PYROLYSIS OF MIXTURES CONTAINING
TRIBROMOFLUOROMETHANE
Leo A. Wall, Washington, D.C., and Walter J. Pummer, Rockville, Md., assignors to the United States of America as represented by the Secretary of the Navy
No Drawing. Filed Oct. 30, 1959, Ser. No. 849,991
8 Claims. (Cl. 260—650)
(Granted under Title 35, U.S. Code (1952), sec. 266)

The invention described herein may be manufactured and used by or for the Government of the United States of America for governmental purposes without the payment of any royalties thereon or therefor.

The present invention relates to the preparation of aromatic fluorocarbons from the pyrolysis of a mixture of substitution products of methane and more particularly to a method for increasing the poor yield of certain aromatic fluorocarbons resulting from the pyrolysis of tribromofluoromethane by itself.

It is known in the art that hexafluorobenzene can be produced by the pyrolysis of tribromofluoromethane alone and that among the by-products of this sythesis are pentafluorobromobenzene in fair yield and traces of perfluorotoluene. These latter compounds are of particular interest since from these compounds derivatives containing one or two functional groups may be prepared. These derivatives in turn will serve as intermediates for further syntheses. As an example, pentafluorobromobenzene readily forms a Grignard reagent from which a variety of derivatives may be synthesized.

At present pentafluorobromobenzene can be produced from hexafluorobenzene but to do so the process steps of hydrogenation and subsequent bromination must be executed.

It is, therefore, an object of the present invention to product practical enhanced yields of pentafluorobromobenzene and perfluorotoluene by a direct route by adding appropriate materials to tribromofluoromethane and then pyrolyzing the mixture.

Other objects of the present invention will become apparent hereinafter.

Thus, Table I shows the conditions under which the mixed pyrolyses were conducted. The products from these pyrolyses were analyzed and the important analyses are cataloged in Tables II, III, and IV.

Table I.—Pyrolysis of Mixtures

| Mixtures | | Weight, g. | Moles | Temp., °C. | Pressure, p.s.i. |
|---|---|---|---|---|---|
| 1 | CFBr₃ | 2,981 | 11 | 540 | 265 |
|   | CBr₄ | 756 | 2.2 |   |   |
| 2 | CFBr₃ | 7,859 | 29 | 540 | 265 |
|   | CBr₄ | 1,307 | 3.8 |   |   |
| 3 | CFBr₃ | 4,490 | 16.5 | 545 | 50 |
|   | CBr₄ | 1,100 | 3.3 |   |   |
| 4 | CFBr₃ | 1,900 | 10.7 | 560 | 150 |
|   | CF₃—CBr₃ | 210 | 1 |   |   |
| 5 | CFBr₃ | 4,065 | 15 | 560 | 150 |
|   | CHBr₃ | 759 | 3.1 |   |   |
| 6 | CFBr₃ | 2,710 | 10 | 540 | 150 |
|   | CF₂Br₂ | 420 | 2 |   |   |
| 7 | CFBr₃ | 3,400 | 12.5 | 540 | 150 |
|   | Br₂ | 1,360 | 8.5 |   |   |

| Mixtures | | Flow, cc./min. | Time, hr. | Rec'd percent | Br₂, percent | Products, g. |
|---|---|---|---|---|---|---|
| 1 | CFBr₃ | 25 | 5 | 98 | 84 | ᵃ 652 |
|   | CBr₄ |   |   |   |   |   |
| 2 | CFBr₃ | 25 | 7 | 67 | 87 | ᵃ 1721 |
|   | CBr₄ |   |   |   |   |   |
| 3 | CFBr₃ | 25 | 5.2 | 98.5 | 69.8 | ᵇ 740 |
|   | CBr₄ |   |   |   |   |   |
| 4 | CFBr₃ | 25 | 4 | 98 | 74 | 793 |
|   | CF₃—CBr₃ |   |   |   |   |   |
| 5 | CFBr₃ | 25 | 11.3 | 95 | 96 | 769 |
|   | CHBr₃ |   |   |   |   |   |
| 6 | CFBr₃ | 25 | 5 | 77 | 68 | 420 {84 C₆F₆, 210 CFBr₃, 126 Residue} |
|   | CF₂Br₂ |   |   |   |   |   |
| 7 | CFBr₃ | 50 | 11 | 70 | ᶜ 49 | 416 {9.5 C₆F₆, 197 CFBr₃, 210 Residue} |
|   | Br₂ |   |   |   |   |   |

ᵃ Combined and distilled together.
ᵇ Product distribution similar to Table II.
ᶜ Does not include the added bromine.

Table II.—Distillation of CFBr₃/CBr₄ Mixtures

| Fraction | Boiling point, °C. | Pressure, mm. | Weight, g. | Products |
|---|---|---|---|---|
| 1 | 25–90 | 760 | 139 | C₆F₆ (80%), CFBrCFBr (10%), CF₂Br₂. |
| 2 | 90–120 | 760 | 848 | CFBr₃ (90%), C₃F₂Br₄, C₆F₅Br. |
| 3 | 120–145 | 760 | 160 | C₆F₅Br (79%), C₂F₂Br₄ (20%), C₇F₇Br. |
| 4 | 85–95 | 25 | 218 | C₆F₄Br₂ (90%), C₂F₂Br₄, C₆F₅Br. |
| 5 | 88–98 | 10 | 61.5 | C₆F₄Br₂ (50%), C₂Br₄ (10%). |
| 6 | 100 | 10 | 268 | Not analyzed. |

Table III.—Distillation of CFBr₃/CF₃CBr₃ Mixtures

| Fraction | Boiling point, °C. | Weight, g. | Products |
|---|---|---|---|
| 1 | 50–95 | 51.2 | C₆F₆ (66%), C₃F₄Br₂ (20%), C₆F₅CF₃ (5%). |
| 2 | 95–106 | 51.7 | CFBr₃ (85%), C₇F₈ (10%), C₆F₆ (5%). |
| 3 | 106–110 | 302.9 | CFBr₃ (90%), C₇F₈ (5%), C₂F₃Br₃ (4%) |
| 4 | 110 | 401 | Not analyzed. |

Table IV.—Distillation of CFBr₃/CHBr₃ Mixture

| Fraction | Boiling point, °C. | Weight, g. | Products |
|---|---|---|---|
| 1 | 45–100 | 69.4 | C₆F₆ (70%), CFHBr₂ (20%). |
| 2 | 100–125 | 510.4 | CFBr₃ (90%), C₂FBr₃. |
| 3 | 125–140 | 69.1 | C₆F₅Br (60%), CHBr₃ (30%), C₇F₇Br, C₆F₄BrH. |
| 4 | 140–175 | 39.7 | C₄F₃Br₃, C₃F₃Br₃, C₆F₇Br. |
| 5 | 175–200 | 94.8 | C₆F₄Br₂, C₂F₂Br₄. |

Though the lowest pressure employed in the pyrolyses of Table I was 50 p.s.i. similar pyrolyses have been conducted at pressures as low as atmospheric in which case a temperature of about 640° C. was required to effect the synthesis.

Although hexafluorobenzene is obtained in all the mixed pyrolyses, the overall composition of the products is such that the yields of desirable derivatives have been increased markedly over that composition resulting from the pyrolysis of tribromofluoromethane alone. As an example, in Table II, the yields of pentafluorobromobenzene (Fraction #3) and dibromotetrafluorobenzene (Fraction #4) have been increased by 15 and 25 percent, respectively, from that obtained by the pyrolysis of tribromofluoromethane alone. Also, in Table III instead of showing up as mere traces as in the case of the pyrolysis of tribromofluoromethane alone the yield of perfluorotoluene has been increased to 14 percent based on the 1,1,1-trifluorotribromoethane added to the $CFBr_3$ is particularly pronounced in view of the dilution ratio of about 10:1 as compared to the other dilution ratios of about 5:1.

The inventors attempted to prepare pentafluorobenzene by the mixed pyrolysis of $CFBr_3$ and $CHBr_3$ but as is shown by Table IV the results were not those expected. The predominant amounts of bromo fluoro compounds indicates that hydrogen bromide was more easily removed than free bromine which is produced during the formation of both pentafluorobromobenzene and perfluorotoluene.

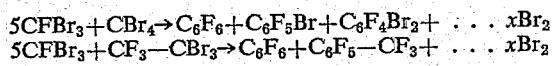

Although a five-to-one ratio of $CFBr_3$ is desirable, this ratio is not necessary.

It has been found, however, that pentafluorobenzene results from the pyrolysis of a mixture of tribromofluoromethane and dibromofluoromethane as well as from the pyrolysis of tribromofluoromethane containing traces of water.

As shown in Table I a mixture of $CFBr_3$ and bromine were pyrolyzed, however, because of the adverse effect of the excess bromine upon the course of the reaction the yield of hexafluorobenzene decreased rapidly.

A mixture of $CFBr_3$ and $CF_2Br_2$ were also pyrolyzed but the product yield of other than $C_6F_6$ was not of sufficient significance to warrant further investigation.

These pyrolyses were conducted in apparatus made of metal with copper tubing and fittings and a stainless steel reservoir. The mixture to be pyrolyzed was placed in the reservoir and the platinum furnace tube was heated to the temperatures shown in Table I. An inert gas under pressure was then admitted to the system and a flow was established to serve the purposes of placing the reaction under pressure, of carrying the reactants into the furnace tube and lastly, of carrying away the bromine formed during the synthesis. Although nitrogen (prepurified) was usually employed, other gases such as helium or argon can be substituted. When the reaction was completed, the pressure was allowed to dissipate. After cooling the resultant composition was washed with aqueous sodium bisulfite solution, then with 5% sodium hydroxide solution and, finally, with water. The liquid was dried and then distilled resulting in the fractions shown in Tables II, III, and IV.

Obviously many modifications and variations of the present invention are possible in the light of the above teachings. It is therefore to be understood that within the scope of the appended claims the invention may be practiced otherwise than as specifically described.

What is claimed is:

1. The production of aromatic fluorocarbons by the pyrolysis of a mixture composed of $CFBr_3$ and a material selected from the group consisting of $CBr_4$, $CHBr_3$ and $CF_3CBr_3$ at a temperature of about 540° C. to 640° C. and at a pressure of from atmospheric to about 265 p.s.i.

2. The production of $C_6F_5Br$ by the pyrolysis of a mixture of $CFBr_3$ and $CBr_4$ at a temperature of about 540° C. and a pressure of about 265 p.s.i.

3. The process recited in claim 2 in which the mixture to be pyrolyzed contains approximately 5 moles of $CFBr_3$ for each mole of $CBr_4$.

4. The production of $C_6F_5Br$ by the pyrolysis of a mixture of $CFBr_3$ and $CHBr_3$ at a temperature of about 560° C. and a pressure of about 150 p.s.i.

5. The process recited in claim 4 wherein the mixture to be pyrolyzed contains approximately 5 moles of $CFBr_3$ for each mole of $CHBr_3$.

6. The production of $C_6F_5CF_3$ by the pyrolysis of a mixture of $CFBr_3$ and $CF_3CBr_3$ at a temperature of about 560° C. and a pressure of about 150 p.s.i.

7. The process recited in claim 6 wherein the mixture to be pyrolyzed contains approximately 10 moles of $CFBr_3$ for each mole of $CF_3CBr_3$.

8. The production of aromatic fluorocarbons by the pyrolysis of a mixture composed of $CFBr_3$ and a material selected from the group consisting of $CF_3CBr_3$, $CHBr_3$ and $CBr_4$ at a temperature of about 540° C. to 560° C. and at a pressure of about 50 p.s.i. to 265 p.s.i.

References Cited in the file of this patent

UNITED STATES PATENTS 2,927,138     Wall et al. _____ Mar. 1, 1960

OTHER REFERENCES

Desirant: Bull, Classe Sci., Acad. Roy. Belg., vol. 41 (1955), pp. 759–60.